United States Patent
Lynch

(10) Patent No.: US 10,881,097 B2
(45) Date of Patent: Jan. 5, 2021

(54) HIGH VOLTAGE WILDLIFE PROTECTION COVER HAVING SKIRTS FOR INCREASING EFFECTIVE SURFACE DISTANCE

(71) Applicant: Eco Electrical Systems, Reno, NV (US)

(72) Inventor: Michael Lynch, Reno, NV (US)

(73) Assignee: ECO ELECTRICAL SYSTEMS, Reno, NV (US)

( * ) Notice: Subject to any disclaimer, the term of this patent is extended or adjusted under 35 U.S.C. 154(b) by 100 days.

(21) Appl. No.: 16/265,624

(22) Filed: Feb. 1, 2019

(65) Prior Publication Data

US 2020/0245610 A1 Aug. 6, 2020

(51) Int. Cl.
*H01B 17/00* (2006.01)
*H01B 17/56* (2006.01)
*A01M 29/32* (2011.01)

(52) U.S. Cl.
CPC ............. *A01M 29/32* (2013.01); *H01B 17/56* (2013.01)

(58) Field of Classification Search
CPC ........ H01B 19/00; H01B 17/00; H01B 17/56; H01B 17/005; H01B 17/26; H01B 7/00; H01B 17/583; H02G 7/00; H02G 1/02; H05K 5/03; H01R 4/70; A01M 29/00; A01M 29/32
USPC ......... 174/152 G, 153 G, 135, 152 R, 138 R, 174/139, 138 F, 137 R, 5 R, 140 H, 174/14 BH, 142, 5 SB
See application file for complete search history.

(56) References Cited

U.S. PATENT DOCUMENTS

| | | | | |
|---|---|---|---|---|
| 4,845,307 A * | 7/1989 | Cumming | ............... | H01B 17/26 174/5 R |
| 6,255,597 B1 * | 7/2001 | Bowling | ................ | H01B 17/00 174/138 F |
| 6,291,774 B1 * | 9/2001 | Williams | ............... | H01B 17/00 174/135 |
| 6,995,313 B1 * | 2/2006 | Barnett | .................. | H01B 17/00 174/138 F |
| 7,154,034 B2 * | 12/2006 | Lynch | .................. | H01H 31/006 174/5 R |
| 7,309,837 B1 * | 12/2007 | Rauckman | ............. | H01B 17/00 174/135 |
| 7,839,256 B2 * | 11/2010 | Bradford | ................ | H01B 17/00 174/138 F |
| 8,633,391 B2 * | 1/2014 | Strong | .................... | F16B 37/14 174/138 F |
| 9,413,153 B2 * | 8/2016 | Spencer | ................. | H01B 17/00 |
| 9,960,586 B2 * | 5/2018 | Niles | ........................ | H02G 7/00 |
| 10,679,815 B1 * | 6/2020 | Lynch | ..................... | H02B 1/06 |

* cited by examiner

*Primary Examiner* — Angel R Estrada
(74) *Attorney, Agent, or Firm* — Patent Law Group; Brian D. Ogonowsky

(57) ABSTRACT

For protecting wildlife from high voltage conductors, dielectric covers are used to cover fuse cutouts, bushings, solid-blade disconnects, lightning arrestors, or other high voltage components. To increase a vertical surface distance between the top of the cover and the bottom of the cover, a plurality of protruding skirts are molded into the cover. The cover is formed of two molded halves, which are later affixed together. To prevent water entering the junction between the two halves, one half is formed with a lip that overlaps the edge of the other half. Retaining pins secure the cover in place.

19 Claims, 11 Drawing Sheets

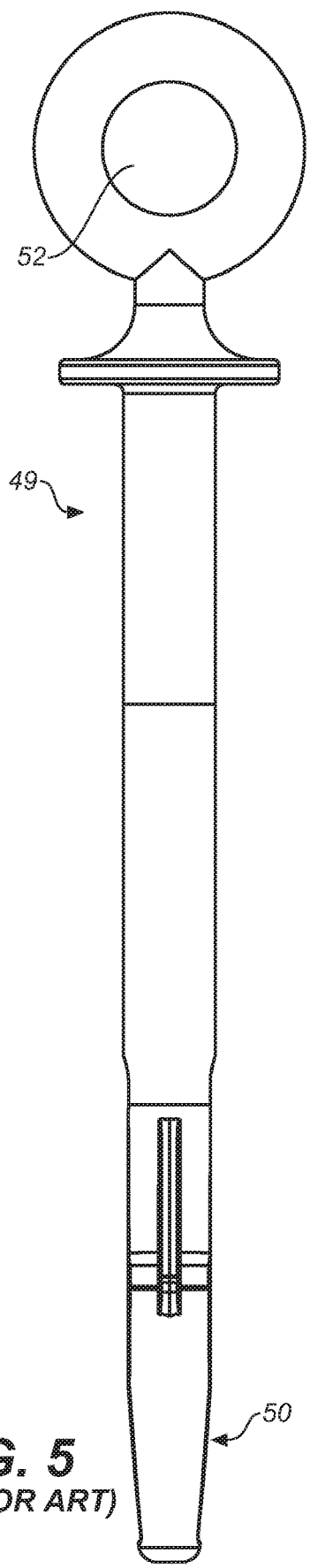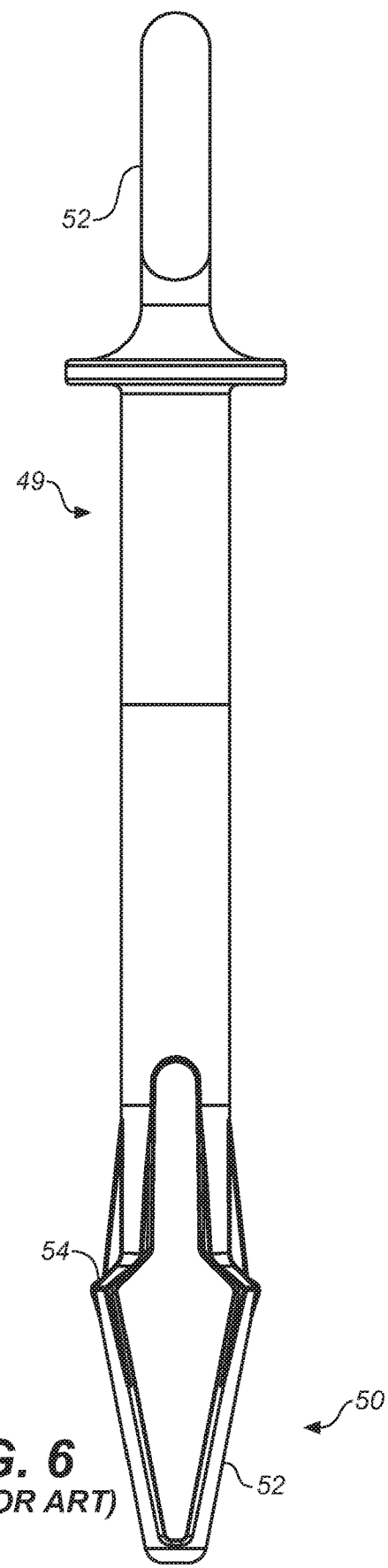
FIG. 5
(PRIOR ART)
FIG. 6
(PRIOR ART)

HIGH VOLTAGE WILDLIFE PROTECTION COVER HAVING SKIRTS FOR INCREASING EFFECTIVE SURFACE DISTANCE

FIELD OF THE INVENTION

The invention relates to dielectric covers for high voltage components in an electric power distribution system, such as a cover for a fuse cutout or a bushing, to protect wildlife.

BACKGROUND

Providing a dielectric cover over a high voltage component in an electrical distribution system is common to protect birds and other animals from electrocution, which may also trigger an over-current condition due to electrical shorts between phases or phase to ground that may cause a power outage. Typically, the cover is used where the high voltage component is proximate to a structure, such as a utility pole, where a large bird may roost.

FIG. 1 illustrates a conventional fuse cutout 10. A mounting bracket 12 secures a ceramic or polymer insulator 14 to a wooden utility pole or crossarm used to support high voltage conductors, such as carrying 3-phase 12 KVAC or higher. A "hot" wire 16 is attached to one phase. The wire 16 is substantially vertical and typically tapped off an overhead wire running between utility poles. A metal connector 18 electrically connects the wire 16 to a top contact 20 of a blowable fuse 22. The fuse 22 electrically connects to a pivot joint 24 and a bottom connector 26. The bottom connector 26 is connected to another wire (not shown) which may lead to a transformer or any other electrical device or conductor. Opening or blowing of the fuse 22 disconnects the top contact 20 from the bottom connector 26.

A metal hook assembly 28 is fixed to the connector 18 and is used to temporarily support a load break tool for opening the fuse 22. A metal pull ring 30 is physically and electrically connected to the upper end of the fuse 22. By coupling the load break tool to the hook assembly 28 and pull ring 30 and then pulling down on the load break tool, the fuse 22 may be pulled away to safely open the circuit.

Applicant's U.S. Pat. No. 7,154,034, incorporated herein by reference, describes a dielectric cover 32 for a cutout 10, where the cover has generally smooth outer and inner surfaces. Other manufactures also sell cutout covers that have generally smooth outer and inner surfaces.

In the example of the problem presented below, it is assumed the cover at least shrouds a generally vertical wire connected to a metal connector supported by a ceramic or polymer insulator, such as the insulator 14 in FIG. 1. The insulator may also be part of a transformer bushing, solid blade switch, lightning arrester, or other high voltage component. The cover is sized so that a bird perching on the support structure, such as a wooden pole or crossarm, cannot easily contact the energized wire or other high voltage metal component while also contacting the grounded support structure. The cover also prevents a bird from alighting on the cutout 10.

Leakage current or a flashover is most likely to occur in a generally vertical direction between the "top" wire and a conductive component (including an animal) below the cover. Software models identify the required dielectric surface distance between two potentials in order to avoid leakage current or a flashover. Therefore, the vertical distance along the outer and/or inner surface of the cover is a key factor in preventing such leakage current or flashover.

Electrically conductive contaminants, such as sea salt, pesticides, etc. may coat the outer surface of the cover and reduce its insulating effectiveness. If water can enter the cover, it may deposit contaminants on the inside wall of the cover to lower the insulating properties of both the outer and inner walls. The cover may be elongated to increase its insulating capability, but this adds cost and bulk to the cover.

What is needed is a dielectric cover for high voltage components for protecting wildlife or other usages, where the vertical insulating properties of the cover are significantly increased without increasing the height of the cover.

SUMMARY

A wildlife-protection dielectric cover for high voltage components is described that includes substantially horizontal skirts to increase the leakage distance along the surface of the cover between the top of the cover and the bottom of the cover. The term "skirt" refers to any added substantially horizontal (after installation) protuberance or indention that increases the surface distance between the top and bottom of the cover. The skirt may also be referred to as a shed, rib, or other suitable term. The skirt may circumscribe the entire cover or a portion of the cover that is most susceptible to the vertical leakage currents.

In one embodiment, each skirt protrudes about 0.75-1 inch from the body of the cover between the skirts. The skirts not only add significant vertical surface distance between the top and bottom of the cover but reduce the likelihood of contaminants alighting on the underside of the skirts and between the skirts by breaking up the water path. Therefore, there is synergy.

The inside of the cover may be smooth, where the outer surface skirts are solid, or the inside of the cover may have indentations (also skirts), which is a reverse of the outer surface skirts. Whether the skirts protrude or are inverted, the vertical surface distance along the cover is significantly increased, improving the insulating properties of the cover.

Prior art dielectric covers are typically molded in one piece but, due to inherent limitations in molding processes, the cover with the skirts is molded in two halves. The halves are connected together after the cover portions are removed from the mold. To prevent rain or water from melted snow/ice entering through the junction of the two halves, one half has a lip that overlaps the junction of the two halves.

The cover may be installed using a hotstick, so may include holes for grasping by the hotstick.

The cover with the skirts may have a suitable form to cover a cutout, transformer bushing, capacitor bushing, switch bushing, solid blade switch, lightning arrester, insulator supporting a horizontal wire, or other high voltage component.

Other features of the cover are also described.

BRIEF DESCRIPTION OF THE DRAWINGS

FIG. 5 is a front view of a retaining pin for the cover of FIG. 4.

FIG. 6 is a side view of the pin of FIG. 5.

Elements labeled with the same numerals in the various figures may be identical or similar.

DETAILED DESCRIPTION

Figure 1:
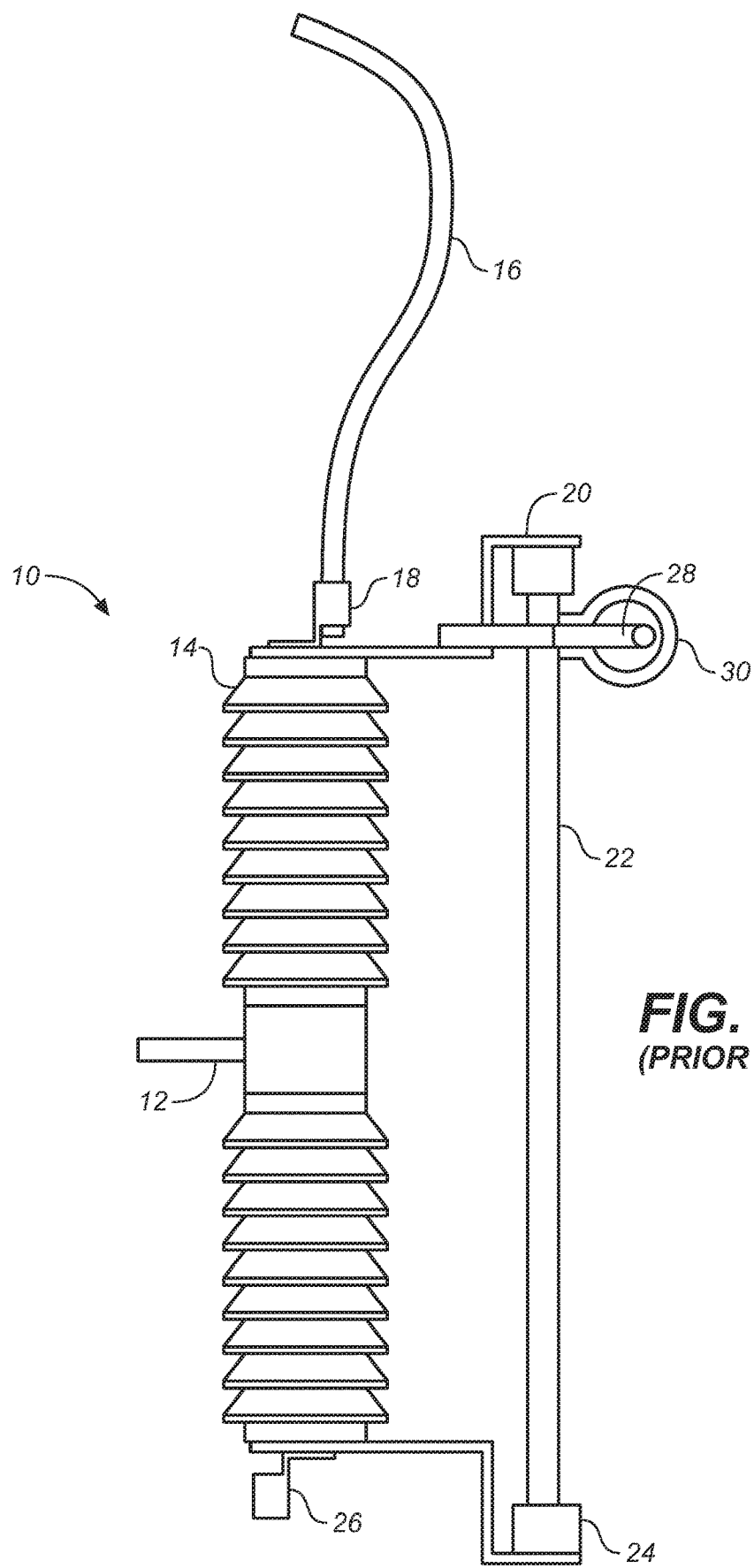
FIG. 1 is a side view of a conventional fuse cutout.
Figure 2:
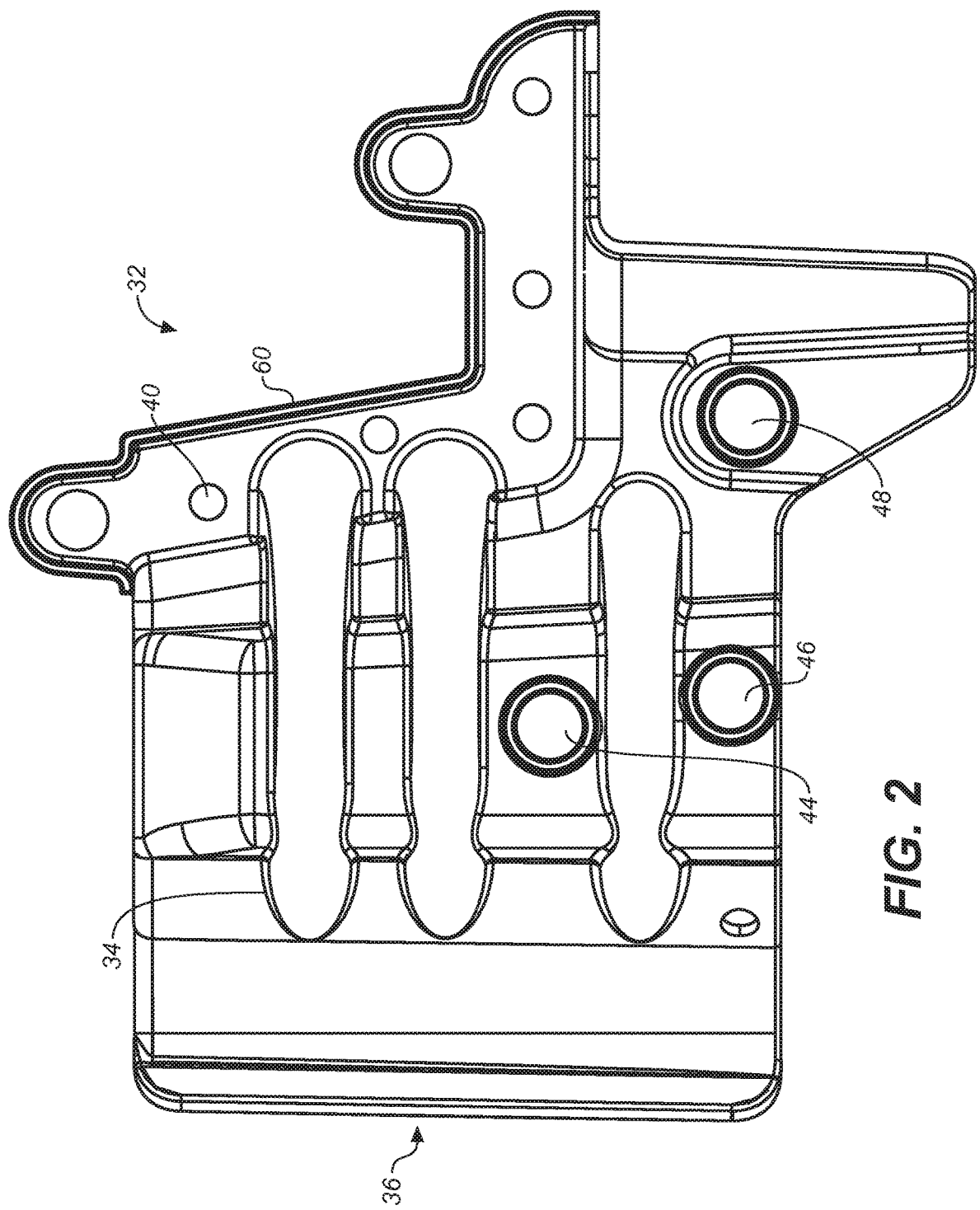
FIG. 2 is a side view of one embodiment of a cutout cover in accordance with one embodiment of the invention.
Figure 3:
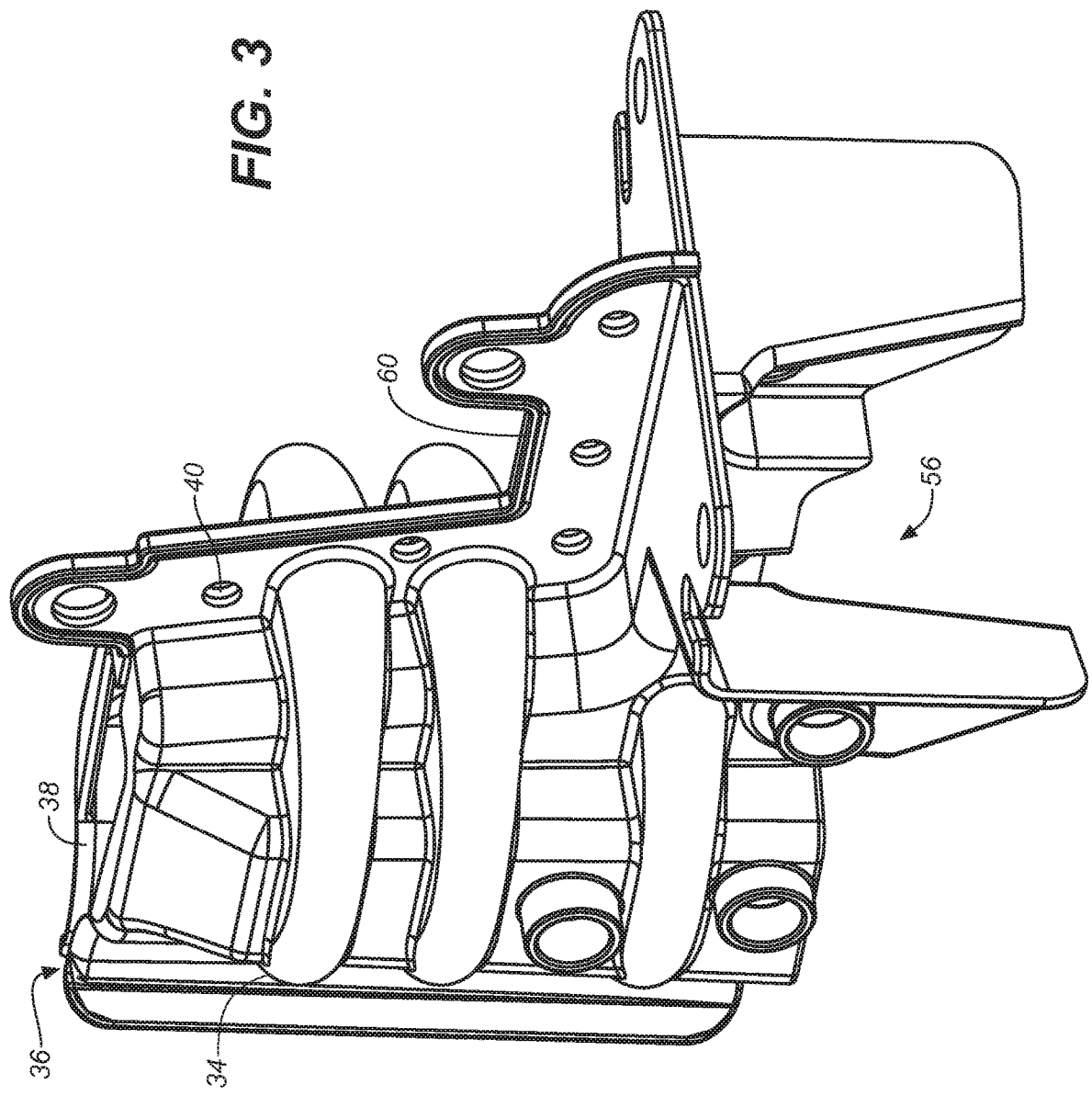
FIG. 3 is a perspective view of the cover of FIG. 2.
Figure 4:
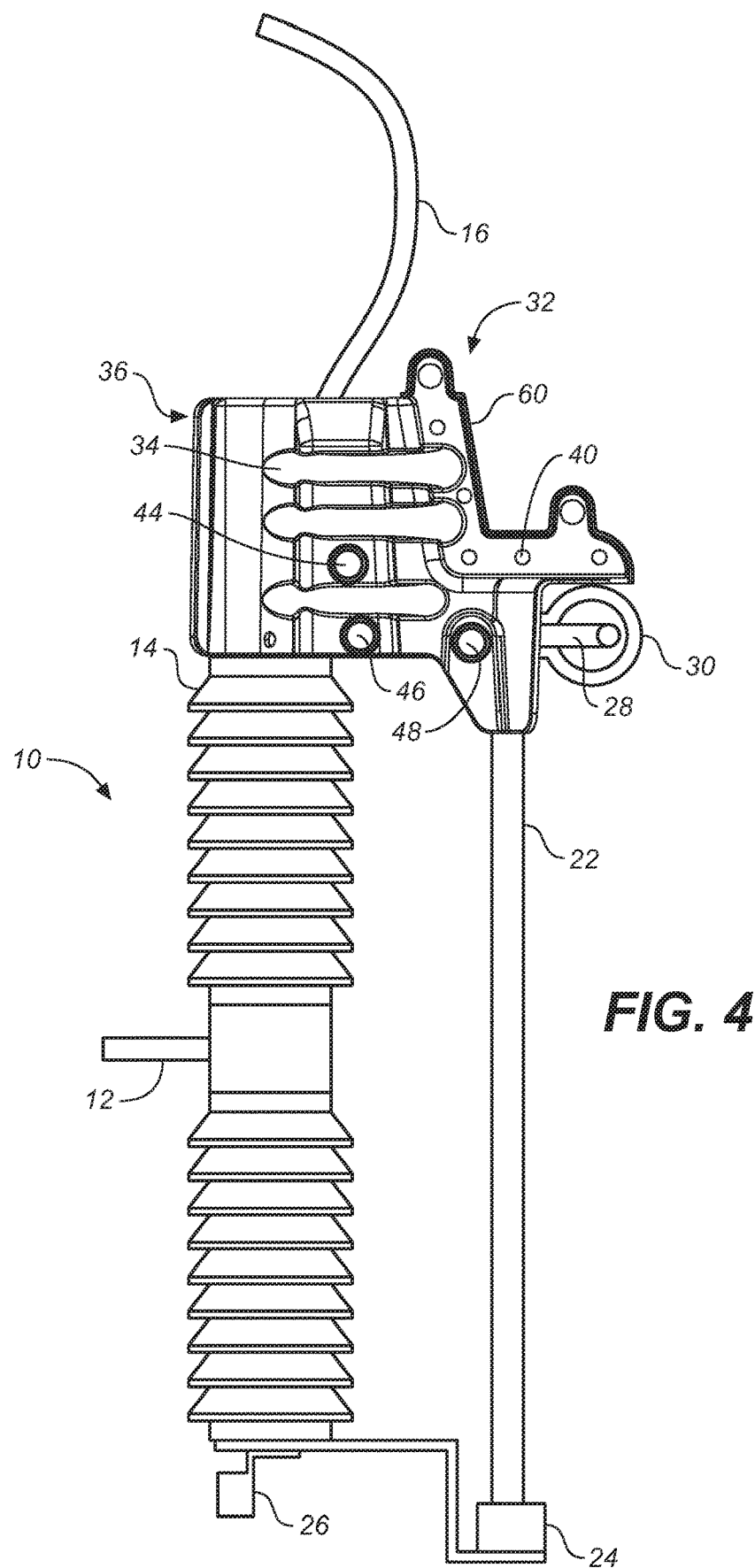
FIG. 4 illustrates the cover of FIG. 3 installed over the cutout of FIG. 1.

FIG. 2 is a side view of one embodiment of a cutout cover 32 in accordance with one embodiment of the invention. FIG. 3 is a perspective view of the cover 32, and FIG. 4 illustrates the cover 32 installed over the cutout 10 of FIG. 1.

The cover 32 is formed of a moldable dielectric polymer. The cover 32 has three horizontal skirts 34 that may extend out 0.75-1 inch from the body of the cover 32. The horizontal direction of the skirts 34 refers to the direction after installation. After installation, the skirts 34 may not be perfectly horizontal but substantially horizontal so that water drips over the edge of the skirts 34 to break up the water's contact path along the cover 32.

The cover 32 has a rear vertical slot 36 so that the cover 32 may be installed over the cutout 10 while the wire 16 (FIG. 4) is connected and energized. Applicant's U.S. Pat. No. 7,154,034 discloses a one-piece smooth-surface cutout cover having a similar vertical slot.

A hole 38 in the top of the cover 32 allows the wire 16 to extend through.

The cover 32 is molded in two halves, since it is difficult to form the skirts 34 in a one-piece cover using injection molding. The two halves are affixed together after removal from the mold by plastic rivets or plastic bolts through the aligned holes 40. The two halves may instead by glue-bonded, melt-bonded, or snapped together. In another embodiment, a lineman snaps the two halves together while installing the cover 32 over a cutout, so the vertical slot 36 is not needed.

The inside walls of the cover 32 may be smooth and do not follow the contours of the skirts 34. In such a case, the skirts 34 are solid. In another embodiment, the skirts 34 are hollow so that the inside walls of the cover 32 are the reverse shape of the outer skirts 34 to form indentations in the inside walls. Such indentations add to the vertical surface distance of the inside walls. This may be desirable in high contamination environments where contaminated water runs along the inside walls of the cover 32.

Another set of aligned holes 44, 46, and 48 are used for securing the cover 32 over the cutout 10.

FIGS. 5 and 6 show a retaining pin 49 that is pushed through two sets of the horizontally-aligned holes 44/46/48 after the cover 32 is positioned over the cutout 10. The pin 49 has a resilient end 50 with a slight taper 52 that makes it easy to push the pin 49 through the holes 44/46/48 using a hotstick grasping the pin 49 by the ring 52. A steeper taper 54 at the end 50 makes it more difficult to pull the pin 49 out. The pin 49 extends under the metal between the connector 18 and contact 20 (FIG. 1) near the insulator 14. Depending on the type of insulator 14 used (e.g., ceramic or a narrower polymer), one of the holes 44 and 46 is best. Another pin 49 goes through the hole 48, under the hook assembly 28 portion just to the left of the fuse 22, to further secure the cover 32 in place.

A wide opening 56 (FIG. 3) in the front of the cover 32 allows a lineman to easily access the hook assembly 28 and pull ring 30 with a loadbreak tool to open the fuse 22.

The lineman may grasp the cover 32 using a hotstick via any of the holes 44/46/48.

Leakage current or a flashover would normally conduct in a generally vertically direction over the outer surface of the cover 32 between the wire 16 at the top and a conductor shrouded by the cover 32 or below the cover 32. A conductor below the cover 32 may even be an animal perching on a grounded surface. Due to airborne contaminants alighting on the cover 32, the insulating properties of the cover 32 may be reduced. The three horizontal skirts 34, assuming protruding 1 inch each, adds at least 6 inches to the vertical surface length between the wire 16 at the top of the cover 32 and the bottom of the cover 32 to greatly increase its insulating properties. Further, the skirts 34 generally block airborne and waterborne contaminants accumulating under a skirt 34 and between the skirts 34, further improving the insulating properties of the cover 32. So there is synergy. As previously mentioned, forming the skirts along the inner walls of the cover 32 may further improve the insulating properties of the cover 32.

The skirts 34 are not formed along the back side of the cover 32 due to the vertical slot 36 in the cover 32 for the wire 16. The skirts 34 are not required to completely surround the cover 32 since the leakage current or flashover would normally only begin where the wire 16 is very close to or in contact with the cover 32 near the top hole 38 in the cover and take the shortest distance to a conductor shrouded by the cover 32 or below the cover 32. Therefore, the "weak link" path in the prior art smooth cover is a vertical path along a side of the cover. The addition of the skirts 34 to the sides of the cover 32 prevents the sides from being the weak link.

The skirts 34 may be formed around the entire circumference of the cover 32 if the vertical slot 36 is not required, such as if the lineman snaps together the two halves after positioning the halves around the wire 16.

The number of skirts 34 may be increased or reduced, and/or the size of the skirts 34 may be increased or reduced, depending on the insulating requirements of the cover 32 and the expected contamination.

The upper half of a skirt 34 may be symmetrical with the lower half of the skirt 34, unlike skirts of conventional ceramic insulators, which typically form inverted cones. This enables the skirts 34 to be more easily formed by molding. Alternatively, the skirts may form an umbrella shape, similar to the skirts of ceramic insulators.

To prevent rain or melted snow/ice from seeping between the junction of the two halves of the cover 32, the right side half is molded to have a lip 60 that overlaps the top edge of the left side half. FIG. 3 best shows the top surface of the lip 60 overlying the junction of the two connected halves.

A more significant problem with leakage current or flashover is between an energized wire and a grounded structure such as a grounded metal housing of a transformer, recloser, capacitor, etc., or between the wire and a bird or other animal alighting on the metal housing.

In order to insulate a high voltage wire from a grounded housing to enable the high voltage to be connected to components inside the housing, a bushing is typically used. A bushing includes a metal connector at the top for the high voltage wire, with a conductor running through the center of an insulating body. The insulating body typically has horizontal skirts (shaped like inverted cones) similar to the insulator 14 in FIG. 1. The insulating body has a mechanical coupling and watertight seal for entering a hole in a grounded housing containing other high voltage components. In this way, the high voltage conductor enters the housing while being insulated from the metal housing. Since the housing is typically grounded, the insulator must have a certain required surface leakage distance between the high voltage incoming wire and the grounded housing.

Dielectric bushing covers are known for protecting wildlife. Such bushing covers have generally smooth outer surfaces and are intended to prevent birds from alighting on top of a bushing and coming in contact with high voltage components.

Figure 7:
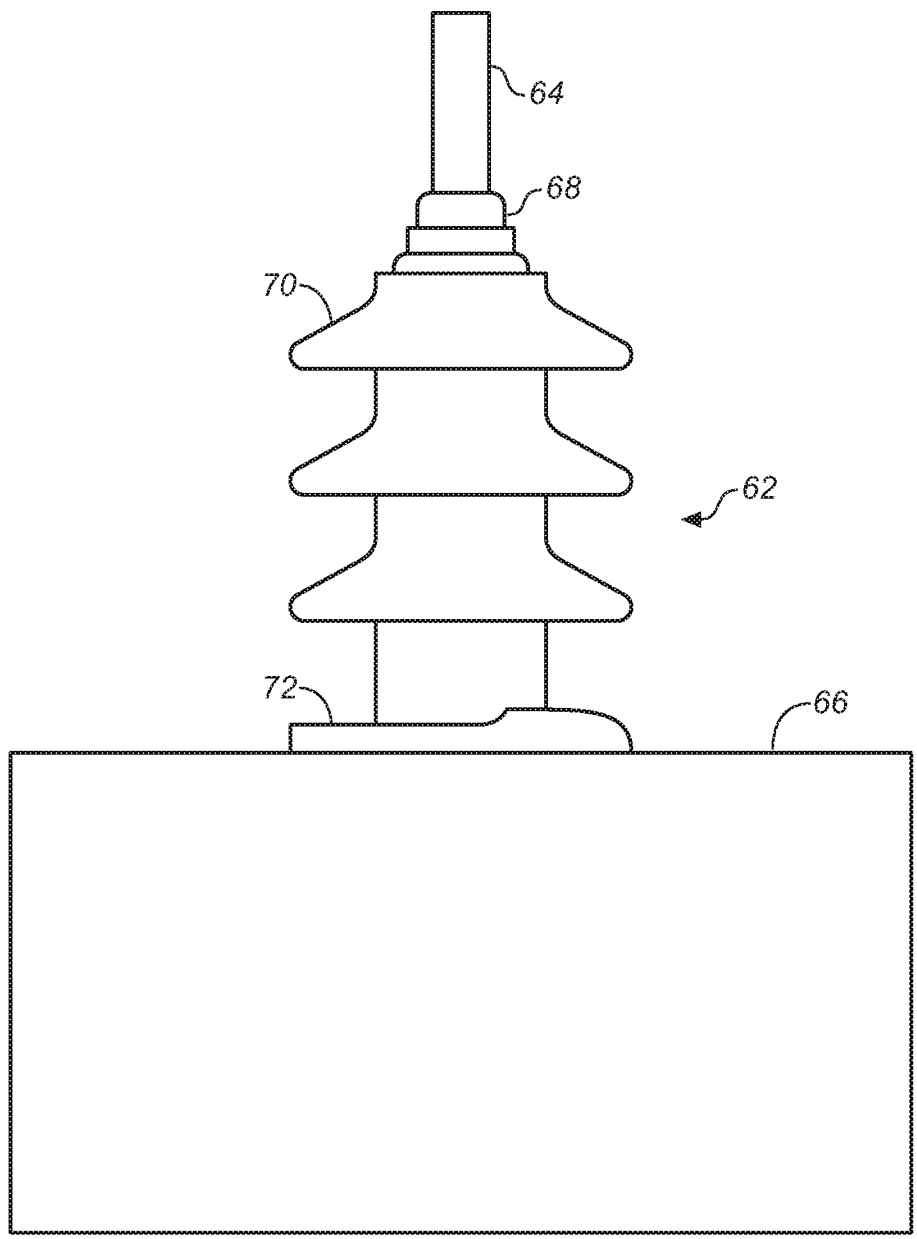
FIG. 7 is a simplified illustration of a transformer, recloser, capacitor, switch, lightning arrestor, or other high voltage equipment using a bushing connected to a wire.

FIG. 7 is a simplified representation of a bushing 62 insulating an incoming high voltage wire 64 from a grounded metal housing 66. The housing 66 represents any conductor that is being insulated from the high voltage. The housing 66 may house a transformer, capacitor, switch, or any other device. A connector 68 connects the wire 64 to a conductor within an insulator 70. A mechanical coupling 72 couples the insulator 70 to the housing 66 and creates a seal. The conductor extends into the housing 66 and is connected to the equipment inside the housing 66. Other bushings (not shown) may be used to connect to other wires, such as carrying a lower voltage output of the transformer.

Birds may alight on the top of the bushing 62 and create a low resistance path to ground, such as via the housing 66, resulting in electrocution and a possible power outage. Therefore, dielectric bushing covers are sometimes used in geographical areas where this may be a problem.

Figure 9:
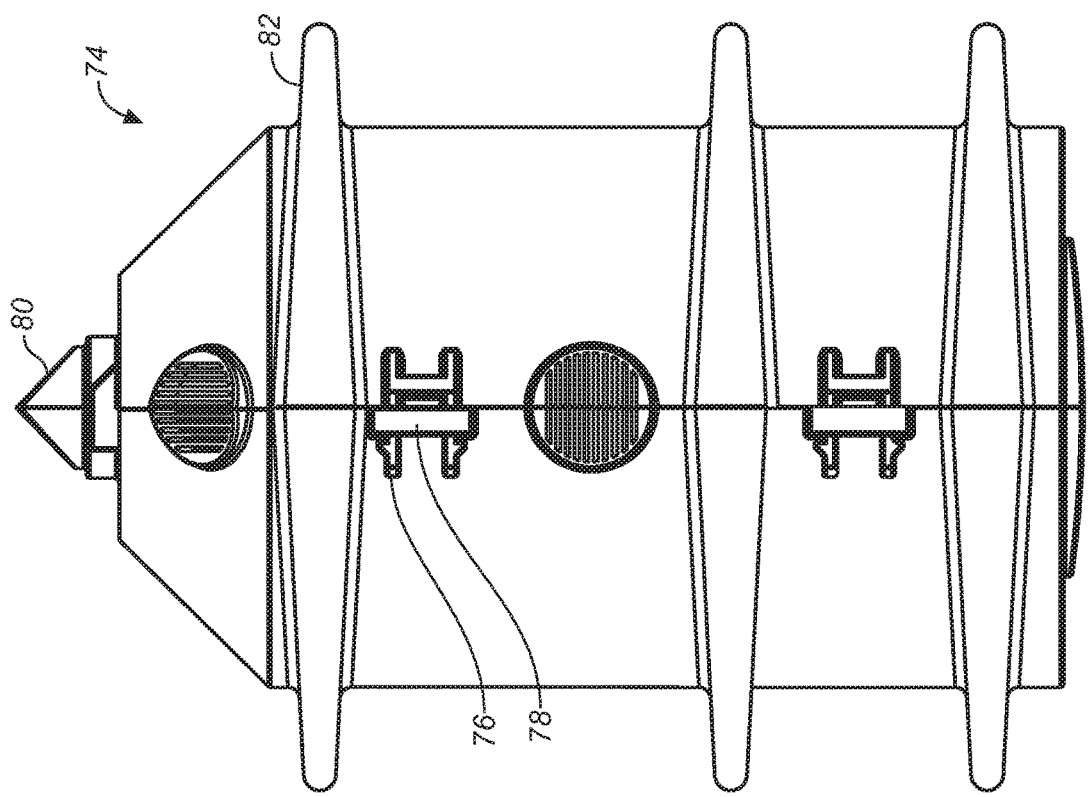
FIG. 9 is a side view of the bushing cover of FIG. 8.
Figure 8:
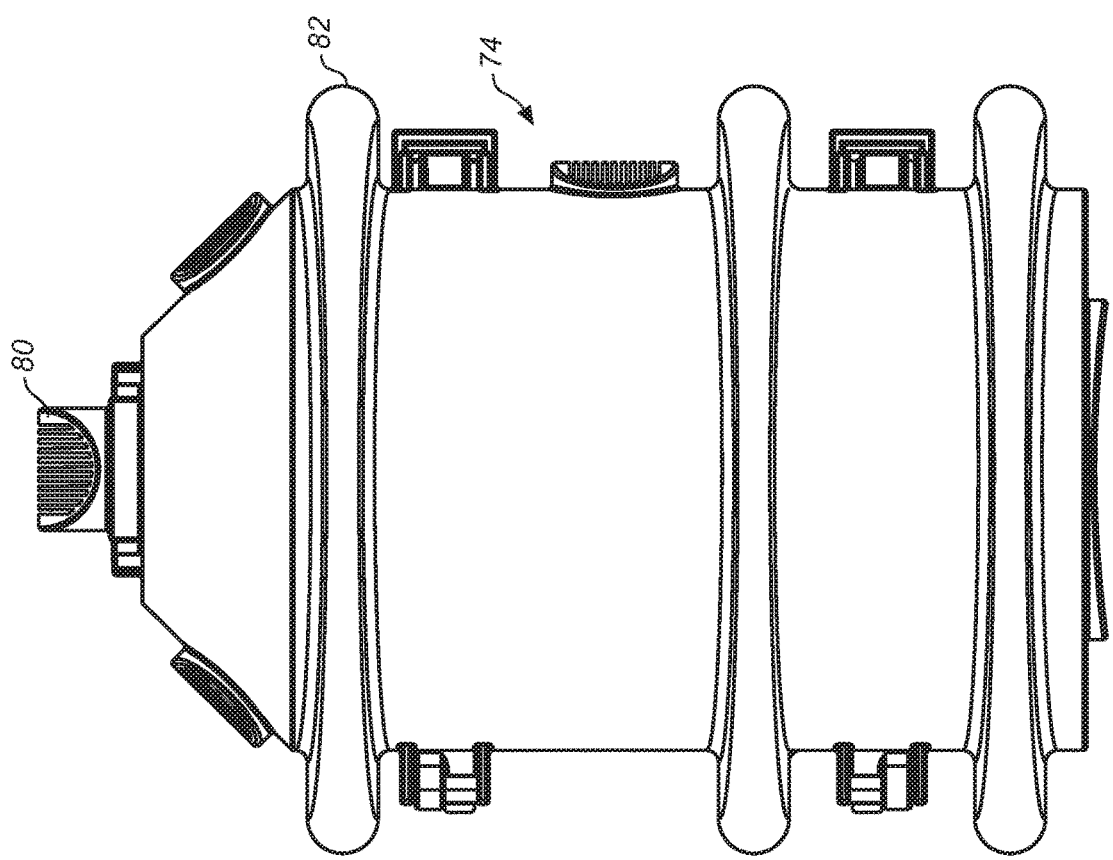
FIG. 8 is a front view of a bushing cover in accordance with another embodiment of the invention.
Figure 10:
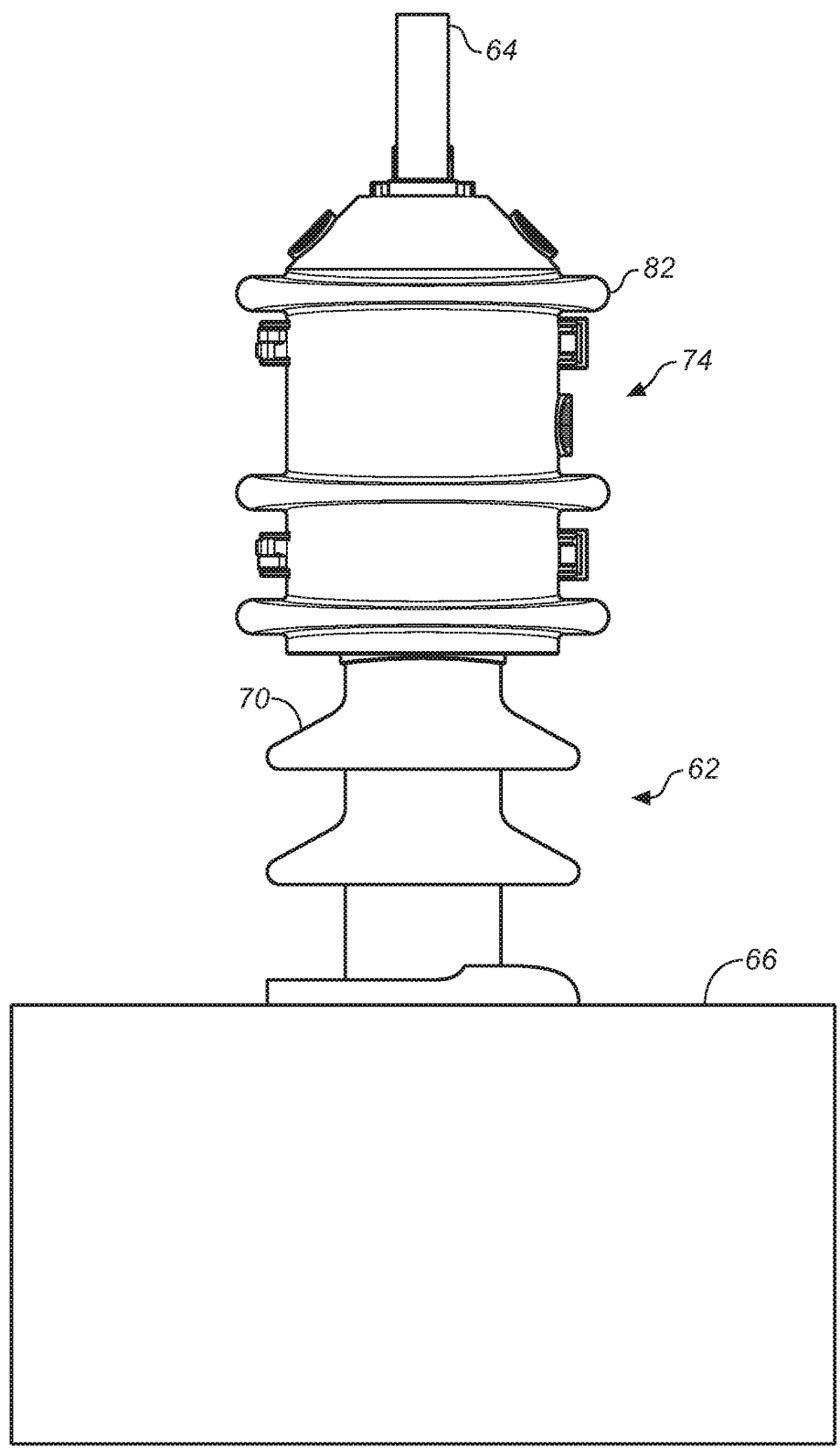
FIG. 10 illustrates the bushing cover of FIG. 9 installed over the bushing of FIG. 7.

FIG. 8 is a front view of a bushing cover 74 in accordance with another embodiment of the invention. FIG. 9 is a side view of the bushing cover 74, and FIG. 10 illustrates the bushing cover 74 installed over the bushing 62.

The bushing cover 74 is molded in two halves and is snapped together after the bushing cover 74 is positioned over the bushing 62. The snapping mechanism may be two resilient prongs 76 (FIG. 9) molded into one half that enter an opening in a tab 78 molded into the other half. Ridges on the prongs 76 prevent the halves coming apart unless the prongs 76 are pushed together.

The cover 74 has a top opening 80 for the vertical wire 64 to enter. FIGS. 8 and 9 show a resilient comb structure at each opening in the cover 74 that prevents small animals and objects from entering the openings. Multiple openings are shown for accommodating different locations of wires. The length of the bushing cover 74 can be any size.

Three horizontal skirts 82 are formed along the length of the cover 74 to increase the vertical surface leakage distance between the top and bottom of the cover 74. The top of the cover 74 is sloped to prevent birds alighting on the top of the cover 74. As with the cutout cover 32 of FIG. 3, the skirts 82 may protrude 0.75-1 inch or any other distance to increase the vertical surface leakage distance to prevent leakage currents and flashovers in worst case scenarios, such as where there are excessive airborne and waterborne contaminants. Any number of skirts 82 can be formed as needed to increase the vertical surface distance between the top and bottom of the cover 74. The advantages of the skirts 82 are the same as discussed with respect to the cutout cover 32. The cover 74 may also have inverted skirts along its inside walls, as described with respect to the cover 32 of FIG. 2.

To prevent water from entering through the junction of the two halves, a lip may be provided on one of the halves that overlaps an edge of the other half.

Figure 11:
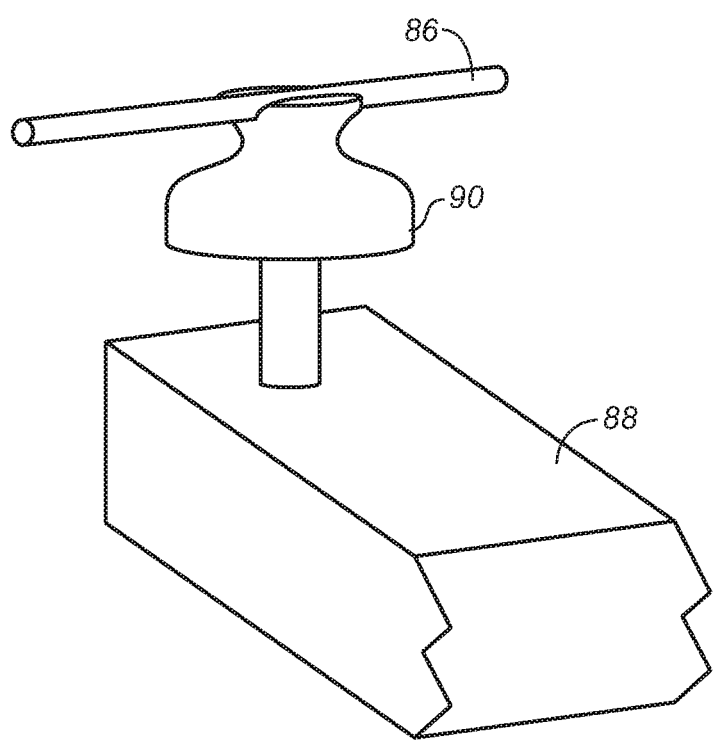
FIG. 11 illustrates a high voltage wire supported by a crossarm of a utility pole via an insulator.

FIG. 11 illustrates a high voltage wire 86 supported by a crossarm 88 of a utility pole via an insulator 90. Since the crossarm 88 is typically wood and connected to an effectively grounded pole, there is a chance of electrocution if a bird contacts the wire 86 and the crossarm 88. It is known to provide dielectric covers for such insulators 90 and the wire 86. Such prior art covers have smooth outer surfaces.

To increase the insulating capability of such a cover, horizontal skirts may be added to the cover.

Figure 12:
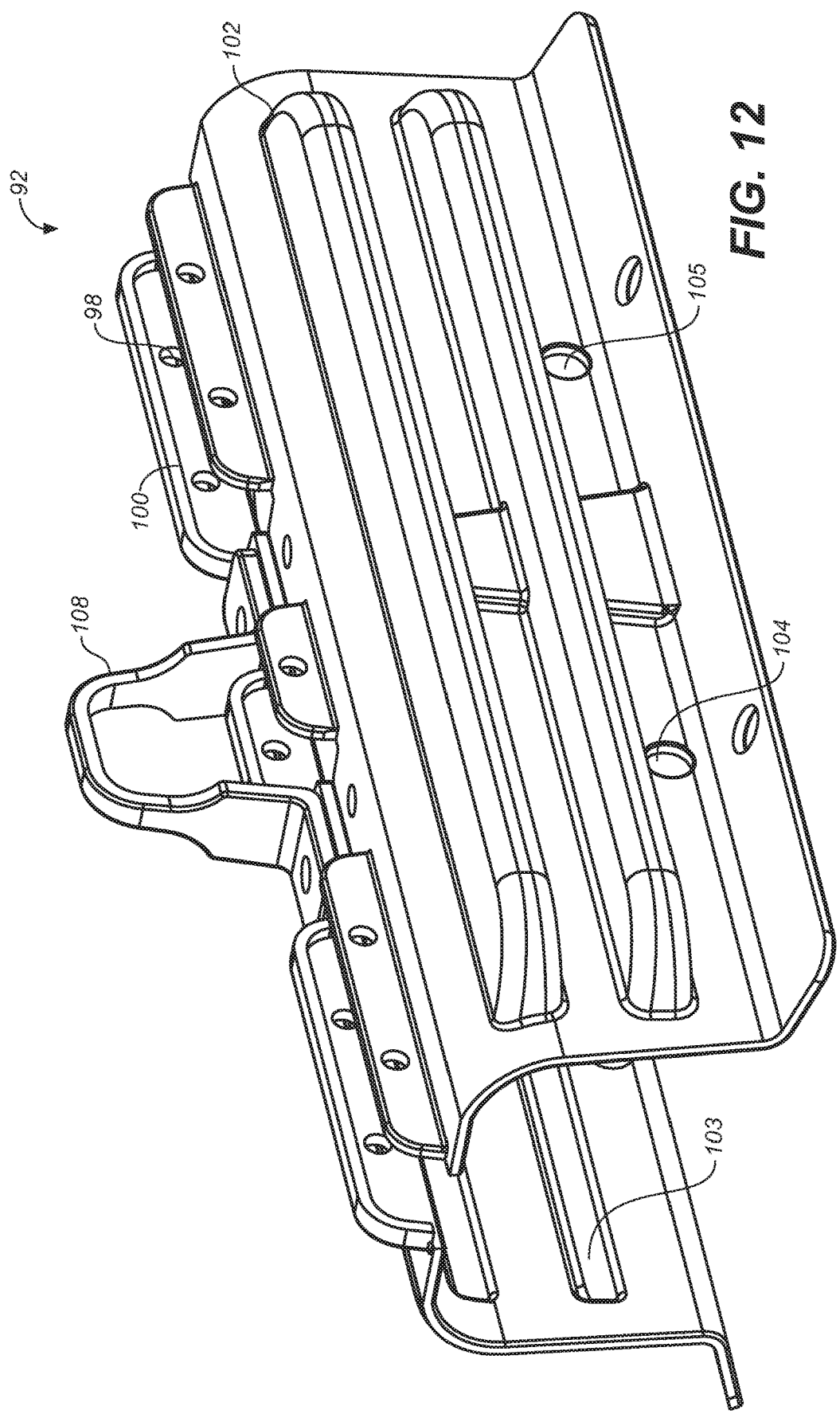
FIG. 12 is a perspective view of a cover for the wire/insulator of FIG. 11 in accordance with another embodiment of the invention.
Figure 13:
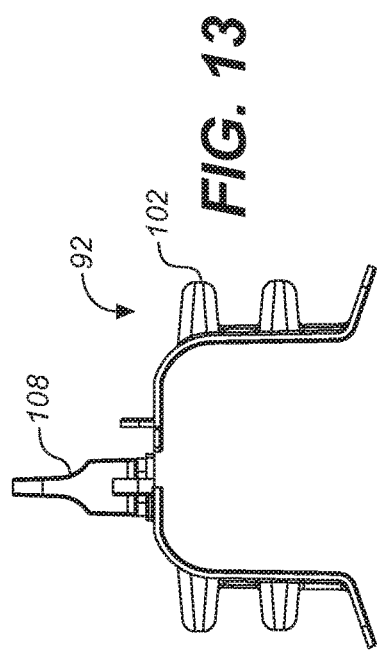
FIG. 13 is an end view of the cover of FIG. 12.
Figure 14:
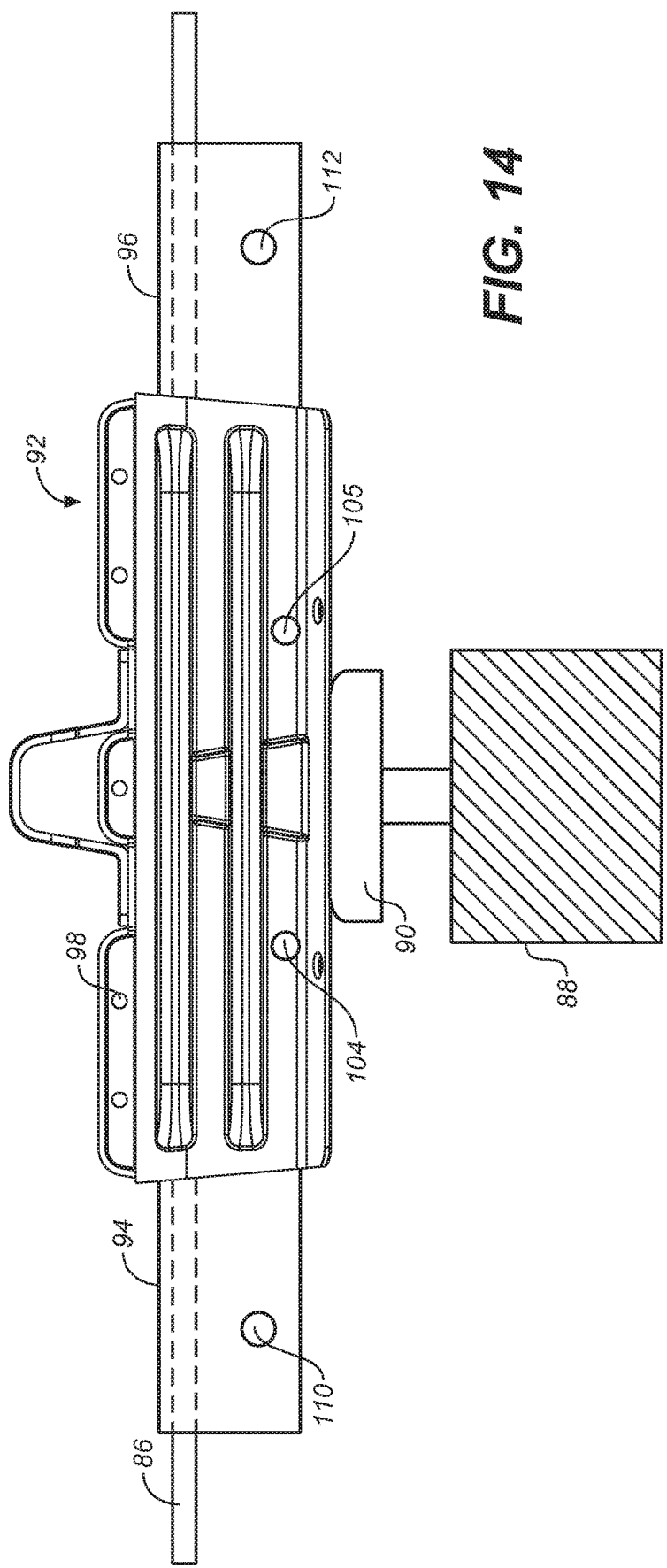
FIG. 14 is a side view of the cover of FIG. 12 installed over the insulator and wire of FIG. 11, where dielectric arms (shortened for illustration) are pivotally connected to the cover to shroud portions of the wire extending from the cover.

FIG. 12 is a perspective view of a cover 92 for the wire 86 and insulator 90 of FIG. 11 in accordance with another embodiment of the invention. FIG. 13 is an end view of the cover 92, and FIG. 14 shows the cover 92 with attachable arms 94 and 96 (greatly shortened for simplicity of illustration) for shrouding a portion of the wire 86 extending out of the cover 92. The arms 94 and 96 may be pivotally connected to the cover 92.

The cover 92 is molded to have two halves, and the halves may be riveted together or bolted together by rivets or bolts through the aligned holes 98. Other means for joining the halves are possible and discussed with reference to the cover 32 of FIG. 3.

To prevent water entering through the junction of the two halves, one half is molded to have a lip 100 (FIG. 12) that overlaps the top edge of the other half.

Horizontal skirts 102 are formed to increase the vertical surface leakage distance between the top of the cover 92, where a bird may alight, and the bottom of the cover 92 to increase the insulating properties of the cover 92. FIG. 12 shows a portion of the inner wall of the cover 92, which shows an inner skirt 103 that is a reverse of the outer skirts 102. The inner walls may instead be smooth by making the skirts 102 solid.

The retaining pin 49 of FIG. 5 is pushed through the holes 104 and 105 to retain the cover 92 in position. The pins 49 are under the wire 86.

A top tab 108 may be grasped by a hot stick for installation.

FIG. 14 shows the arms 94 and 96 attached to the cover 92. A pin 49 is inserted through the holes 110 and 112 in the arms 94 and 96 to retain the arms 94 and 96 in position.

Many other designs of dielectric covers with horizontal skirts are possible, depending on the particular application. Although the skirts in the various designs have been described as horizontal, the skirts are formed to be substantially horizontal when the cover is installed and generally perpendicular to a likely direction of leakage current or flashover along the surface of the cover.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A wildlife protection device for a high voltage power system comprising:

a dielectric cover configured to shroud at least a portion of a high voltage component, the cover being configured to have a top and bottom when shrouding the high voltage component, the cover having a plurality of substantially horizontal skirts, in its intended operating orientation, the skirts being vertically spaced from one another, at least one of the skirts extending along a majority of a horizontal circumference of the cover in the same horizontal plane as the at least one of the skirts, to increase a vertical surface leakage distance between the top and bottom of the cover to increase the cover's insulating properties.

2. The device of claim 1 wherein the skirts are formed on an outer surface of the cover.

3. The device of claim 1 wherein the skirts are formed on an inside surface of the cover.

4. The device of claim 1 wherein the skirts are formed on both an outer surface of the cover and an inside surface of the cover.

5. The device of claim 1 wherein each of the skirts has a top half that is symmetrical with a bottom half.

6. The device of claim 1 further comprising holes in the cover for receiving retaining pins.

7. The device of claim 1 wherein the cover is molded as two halves, and wherein the halves are joined together.

8. The device of claim 7 wherein one of the halves has a lip which covers a junction of the two halves.

9. The device of claim 1 wherein the skirts protrude out at least 0.75 inch from a body of the cover.

10. The device of claim 1 wherein the cover is a fuse cutout cover.

11. The device of claim 1 wherein the cover is a bushing cover.

12. The device of claim 1 wherein the cover covers a portion of an insulator supporting a conductor.

13. The device of claim 12 wherein the cover covers an insulator supporting a substantially horizontal wire.

14. The device of claim 1 wherein the cover is molded as two halves, and wherein the halves are affixed together by one of bolts, rivets, glue, melting, and a snap-together mechanism.

15. The device of claim 1 wherein an inside surface of the cover does not follow contours of the skirts.

16. The device of claim 1 wherein the cover is installed over the high voltage component.

17. The device of claim 1 wherein the cover has an opening in its top surface for a wire.

18. The device of claim 1 wherein the cover has provisions for installing with a hot stick while the high voltage component is energized.

19. The device of claim 1 wherein the cover is installed over a top of an insulator.

* * * * *